United States Patent
Tabushi et al.

(10) Patent No.: US 10,027,840 B2
(45) Date of Patent: Jul. 17, 2018

(54) PRINTER AND NON-TRANSITORY STORAGE MEDIUM STORING INSTRUCTIONS EXECUTABLE BY THE PRINTER

(71) Applicant: BROTHER KOGYO KABUSHIKI KAISHA, Nagoya-shi, Aichi-ken (JP)

(72) Inventors: Chika Tabushi, Nagoya (JP); Masataka Yamazaki, Kuwana (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/471,848

(22) Filed: Mar. 28, 2017

(65) Prior Publication Data

US 2017/0359477 A1 Dec. 14, 2017

(30) Foreign Application Priority Data

Jun. 13, 2016 (JP) ................................ 2016-116943

(51) Int. Cl.
  *H04N 1/23* (2006.01)
  *G06K 15/02* (2006.01)
  *H04N 1/32* (2006.01)

(52) U.S. Cl.
  CPC ....... *H04N 1/2338* (2013.01); *G06K 15/1813* (2013.01); *G06K 15/1836* (2013.01); *H04N 1/32101* (2013.01); *H04N 2201/0094* (2013.01); *H04N 2201/3205* (2013.01)

(58) Field of Classification Search
  CPC .................................................. H04N 1/2338
  USPC ....................................................... 358/1.13
  See application file for complete search history.

(56) References Cited

U.S. PATENT DOCUMENTS

| | | | |
|---|---|---|---|
| 6,141,028 A * | 10/2000 | Aruga | B41J 11/009 347/193 |
| 7,450,252 B1 | 11/2008 | Idehara | |
| 2003/0184813 A1 | 10/2003 | Kobayashi et al. | |
| 2012/0201549 A1* | 8/2012 | Sakata | G03G 15/6591 399/16 |
| 2017/0032561 A1* | 2/2017 | Choi | G06K 15/02 |

FOREIGN PATENT DOCUMENTS

| | | |
|---|---|---|
| JP | 2000203104 A | 7/2000 |
| JP | 2003296055 A | 10/2003 |
| JP | 2015066784 A | 4/2015 |

* cited by examiner

*Primary Examiner* — Jacky X Zheng (74) *Attorney, Agent, or Firm* — Scully, Scott, Murphy & Presser, P.C.

(57) ABSTRACT

In a printer, when a storage print job is a print job for execution of carbon-copy printing, a controller performs: creating a plurality of bit map data by rasterizing page-description-language data contained in the storage print job a plurality of times; storing the created bit map data; and controlling an image former to print images based on the stored bit map data when a print instruction for the storage print job is received. When the storage print job is a print job not for execution of the carbon-copy printing, the controller performs: storing the page-description-language data contained in the storage print job; when the print instruction for the storage print job is received, rasterizing the stored page-description-language data to create bit map data; and controlling the image former to print an image based on the created bit map data.

12 Claims, 9 Drawing Sheets

FIG.7A  FIG.7B
CARBON-COPY SETTING: OFF

FIG.7C  FIG.7D
CARBON-COPY SETTING: ON

PRINTER AND NON-TRANSITORY STORAGE MEDIUM STORING INSTRUCTIONS EXECUTABLE BY THE PRINTER

CROSS REFERENCE TO RELATED APPLICATION

The present application claims priority from Japanese Patent Application No. 2016-116943, which was filed on Jun. 13, 2016, the disclosure of which is herein incorporated by reference in its entirety.

BACKGROUND

The following disclosure relates to a printer having a storage printing function and a carbon-copy printing function and to a non-transitory storage medium storing a plurality of instructions executable by a computer of the printer.

There is known a storage printing function as one of functions of a printer. In the case where the storage printing function is effective, when a print job is received from an external device, the printer stores image data contained in the print job into a memory without immediate printing, and when a print instruction for the print job is thereafter received, the printer starts printing an image based on the image data contained in the print job.

There is known a carbon-copy printing function as another of the functions of the printer. In the case where the carbon-copy printing function is effective, the printer automatically creates a plurality of bit map data based on page-description-language data (hereinafter referred to as "PDL data") contained in the print job and sequentially prints images based on the plurality of bit map data.

Examples of a mode of storage of the image data contained in the print job by the printer include: a mode in which the PDL data is stored in the memory; and a mode in which the PDL data is rasterized to bit map data, and the bit map data is compressed and stored. The mode of storage of the image data contained in the print job may be selected by comparing an amount of the PDL data with an amount of the compressed bit map data.

SUMMARY

In conventional printers, however, there is room for improvements. That is, in the conventional printers, a function applied to the print job is not considered when the image data contained in the print job is stored. For example, the carbon-copy printing function is in most cases used for printing images for customer and for store when a cost estimate is issued at a window of the store, for example, leading to a high necessity of early obtainment of printed sheets. In the conventional printers, even in the case of the print job using the function having the high necessity of early obtainment of the printed sheets, the PDL data is in some cases stored into the memory without rasterization. When the PDL data is stored into the memory without rasterization, the PDL data is rasterized to bit map data after a print instruction is accepted, resulting in later start of printing.

Accordingly, an aspect of the disclosure relates to a technique for advantageously storing image data contained in a print job in a printer having a storage printing function and a carbon-copy printing function.

In one aspect of the disclosure, a printer includes: a communicator configured to receive a print job; a storage; an image former configured to print an image on a sheet; a receiver configured to receive a print instruction; and a controller configured to execute: storage printing in which printing is performed based on the print job when the print instruction for the print job is received via the receiver after reception of the print job; and carbon-copy printing in which a creating processing in which bit map data is created by rasterizing page-description-language data contained in the print job is executed a plurality of times to create a plurality of bit map data, and images are respectively printed based on the plurality of created bit map data. The controller is configured to, when a storage print job received via the communicator is a print job for execution of the carbon-copy printing, perform: creating the plurality of bit map data by rasterizing page-description-language data contained in the storage print job a plurality of times; storing the plurality of created bit map data into the storage; and controlling the image former to respectively print the images based on the plurality of bit map data stored in the storage when a print instruction for the storage print job is received via the receiver. The controller is configured to, when the received storage print job is a print job not for execution of the carbon-copy printing, perform: storing the page-description-language data contained in the received storage print job into the storage; when the print instruction for the storage print job is received via the receiver, rasterizing the page-description-language data stored in the storage, to create bit map data; and controlling the image former to print an image based on the created bit map data.

In another aspect of the disclosure, a printer includes: a communicator configured to receive a print job; a storage; an image former configured to print an image on a sheet; a receiver configured to receive a print instruction; and a controller configured to perform: when the received print job is a print job which is for execution of particular printing and for which the image former is controlled to print an image when the print instruction is received via the communicator, rasterizing page-description-language data contained in the received print job to create first bit map data and second bit map data and storing the created first bit map data and the created second bit map data into the storage; and when the received print job is not a print job which is for execution of the particular printing and for which the image former is controlled to print an image when the print instruction is received via the communicator, storing page-description-language data contained in the received print job into the storage. The controller is configured to, when the print instruction for the received print job is received via the receiver, perform: when the first bit map data and the second bit map data are stored in the storage, controlling the image former to print an image based on the first bit map data stored in the storage and an image based on the second bit map data stored in the storage; and when the first bit map data and the second bit map data are not stored in the storage, and the page-description-language data is stored in the storage, rasterizing the page-description-language data stored in the storage to create third bit map data and controlling the image former to print an image based on the created third bit map data.

Yet another aspect of the disclosure relates to a non-transitory storage medium storing a plurality of instructions executable by a computer of a printer. The printer includes: a storage; an image former configured to print an image on a sheet; and a receiver configured to receive a print instruction. When executed by the computer, the plurality of instructions cause the printer to, when a received storage print job is a print job for execution of the carbon-copy printing, perform: creating a plurality of bit map data by rasterizing page-description-language data contained in the received storage print job a plurality of times; storing the plurality of created bit map data into the storage; and controlling the image former to respectively print the images based on the plurality of bit map data stored in the storage when a print instruction for the received storage print job is received via the receiver. When executed by the computer, the plurality of instructions cause the printer to, when the received storage print job is a print job not for execution of the carbon-copy printing, perform: storing the page-description-language data contained in the received storage print job into the storage; when the print instruction for the received storage print job is received via the receiver, rasterizing the page-description-language data stored in the storage, to create bit map data; and controlling the image former to print an image based on the created bit map data.

In yet another aspect of the disclosure, a method of printing in a printing system including: a storage; an image former configured to print an image on a sheet; and a receiver configured to receive a print instruction. The printing system is configured to execute: storage printing in which printing is performed based on the print job when the print instruction for the print job is received via the receiver after reception of the print job; and carbon-copy printing in which a creating processing in which bit map data is created by rasterizing page-description-language data contained in the print job is executed a plurality of times to create a plurality of bit map data, and images are respectively printed based on the plurality of created bit map data. The method further includes: when a received storage print job is a print job for execution of the carbon-copy printing, creating a plurality of bit map data by rasterizing page-description-language data contained in the received storage print job; storing the plurality of created bit map data into the storage; and controlling the image former to respectively print the images based on the plurality of bit map data stored in the storage when a print instruction for the received storage print job is received via the receiver. The method further includes: when the received storage print job is a print job not for execution of the carbon-copy printing, storing the page-description-language data contained in the received storage print job into the storage; when the print instruction for the received storage print job is received via the receiver, rasterizing the page-description-language data stored in the storage, to create bit map data; and controlling the image former to print an image based on the created bit map data.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Hereinafter, there will be described one embodiment by reference to the drawings. In this embodiment, the present disclosure is applied to a printer having a storage printing function and a carbon-copy printing function.

Figure 1:
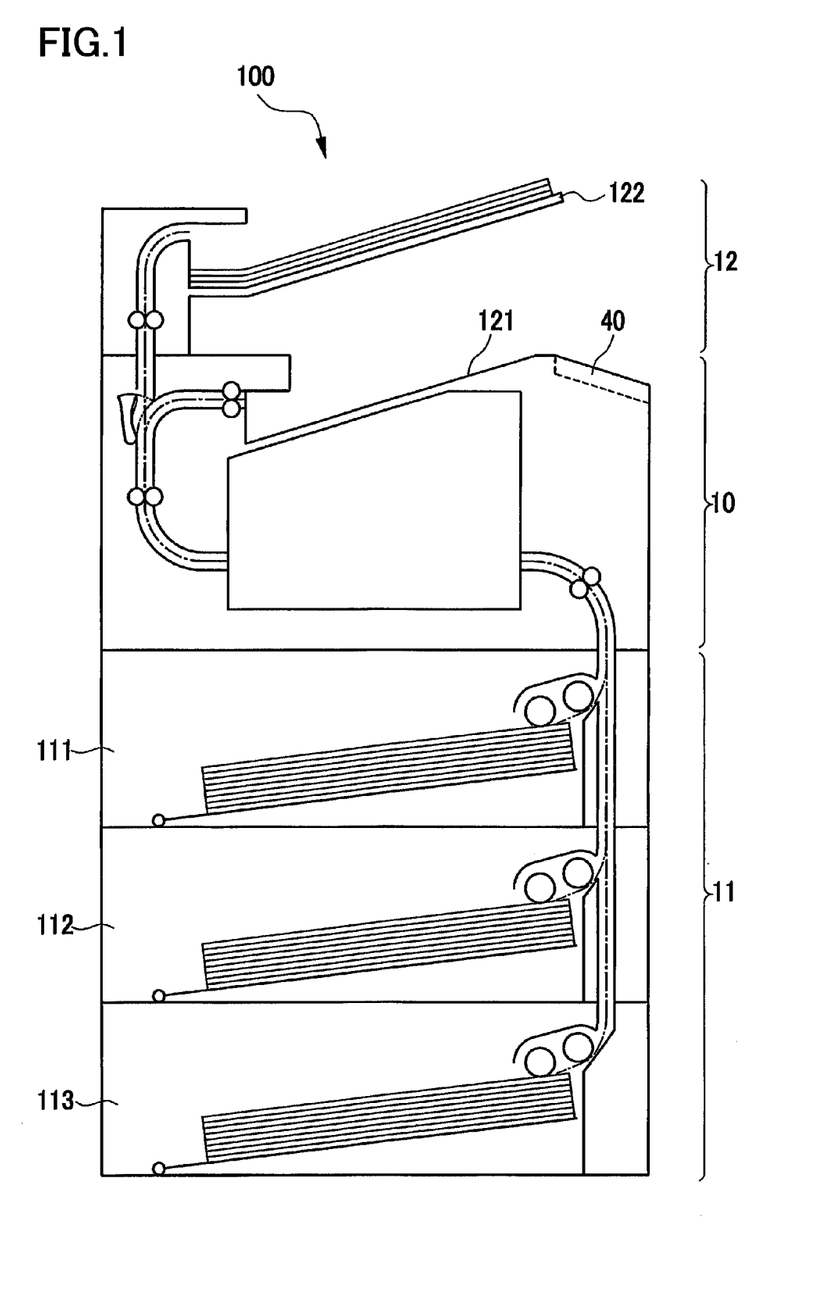
FIG. 1 is a cross-sectional view illustrating a general structure of a printer according to one embodiment.

As illustrated in FIG. 1, a printer 100 according to one embodiment includes: an image former 10 configured to print an image on a sheet; a sheet-supply unit 11; and a sheet-output unit 12. The image former 10 may be any of an electronic photographic image forming device and an ink-jet image forming device. The printer 100 may be any of an apparatus capable of forming color images and an apparatus only capable of forming monochrome images. The printer 100 may be any of an apparatus capable of performing duplex printing and an apparatus only capable of performing simplex printing.

The printer 100 includes a plurality of sheet-supply trays of the sheet-supply unit 11. Each of the sheet-supply trays of the sheet-supply unit 11 stores sheets for printing. Specifically, as illustrated in FIG. 1, the printer 100 includes sheet-supply trays 111, 112, 113 arranged in an up and down direction. It is noted that the printer 100 may include only one sheet-supply tray and may include not only the sheet-supply trays 111, 112, 113 but also another additional sheet-supply tray. Also, the printer 100 may include an openable multipurpose sheet-supply tray and a manual tray.

The printer 100 includes a plurality of sheet-output trays of the sheet-output unit 12. Each of the sheet-output trays of the sheet-output unit 12 stores printed sheets. Specifically, as illustrated in FIG. 1, the printer 100 includes: a sheet-output tray 121 provided on an upper surface of a body of the printer 100; and an additional sheet-output tray 122. It is noted that the printer 100 may include only one sheet-output tray and may include not only the sheet-output trays 121, 122 but also another additional sheet-output tray. Also, the printer 100 may include an openable multipurpose sheet-output tray.

The printer 100 includes an operation panel 40 provided on the upper surface of the body. The operation panel 40 displays various kinds of information for a user and accepts input of instructions performed by the user. The operation panel 40 is one example of a receiver.

Figure 2:
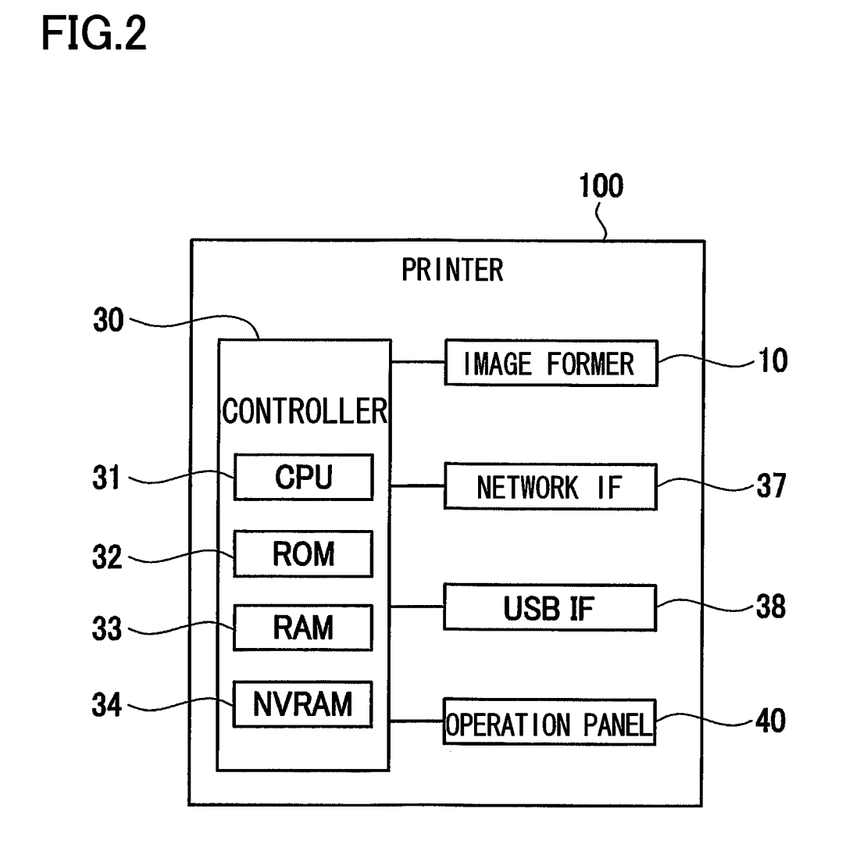
FIG. 2 is a block diagram illustrating an electric configuration of the printer.

There will be next described an electric configuration of the printer 100. As illustrated in FIG. 2, the printer 100 includes a controller 30. The controller 30 includes a central processing unit (CPU) 31, a read-only memory (ROM) 32, a random-access memory (RAM) 33; and a nonvolatile (non-transitory) random access memory (NVRAM) 34. The printer 100 includes the image former 10, a network interface 37, a USB interface 38, and the operation panel 40. These devices are electrically connected to the controller 30.

The ROM 32 stores various kinds of control programs, settings, initial values, and other similar information for controlling the printer 100. Each of the RAM 33 and the NVRAM 34 is used as a working area from which the various kinds of control programs are read or as a storage area for temporarily storing data. One of the RAM 33 and the NVRAM 34 is one example of a storage.

According to the control program read from the ROM 32, the CPU 31 controls the devices of the printer 100 while storing results of processings into the RAM 33 or the NVRAM 34. The CPU 31 is one example of a controller. It is noted that the controller 30 is another example of the controller. The controller 30 in FIG. 2 is a generic collective name for various kinds of hardware used for control of the printer 100 such as the CPU 31 and may not be a single piece of hardware provided in the printer 100 in reality.

The network interface 37 is hardware for communication with devices connected over a network. The network interface 37 may perform any of wired communication and wireless communication. The USB interface 38 is hardware for communication with a device connected via a USB cable, for example. Each of the network interface 37 and the USB interface 38 is one example of a communicator.

There will be next described functions of the printer 100. The printer 100 has at least the storage printing function for storage printing and the carbon-copy printing function for carbon-copy printing and accepts a print job for which use of one or both of these functions is set.

The storage printing function is a function in which in the case where a print job is received, printing for the received print job is not started immediately but started when a print instruction is accepted by the operation panel 40. When having received a print job designating the storage printing, the printer 100 stores image data contained in the received print job, into the RAM 33 or the NVRAM 34 and does not start printing until the print instruction is accepted. For example, the user outputs the print instruction by pushing a printing start button of the operation panel 40. In the case where image data is stored or accumulated, the image data may be stored without compression and may be compressed and stored.

The carbon-copy printing function is a function in which a processing for rasterizing page-description-language (PDL) data contained in the received print job to create bit map data is executed a plurality of times to create a plurality of bit map data, and images are printed based on the created bit map data. That is, the printer 100 performs printing a plurality of times based on one print job for which the carbon-copy printing is designated. These printings are not merely a plural number of printings but are printings using different print settings.

There will be explained operations of the printer 100 in the case where a print job using the storage printing function and not using the carbon-copy printing function is received. FIGS. 3A-3D illustrate the operations of the printer 100 in the case where the print job using the storage printing function and not using the carbon-copy printing function is received.

Figure 3A:
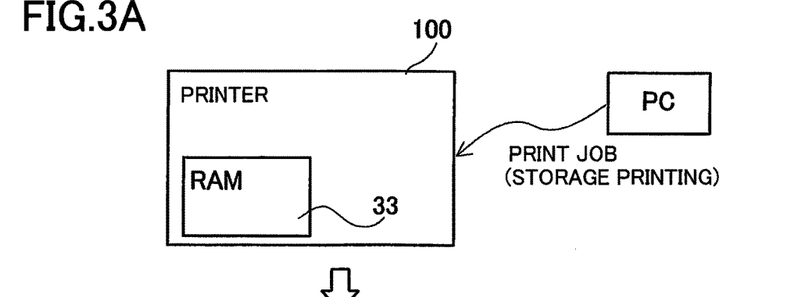
FIGS. 3A through 3D are views for explaining a procedure of storage printing without carbon-copy printing.
Figure 3B:
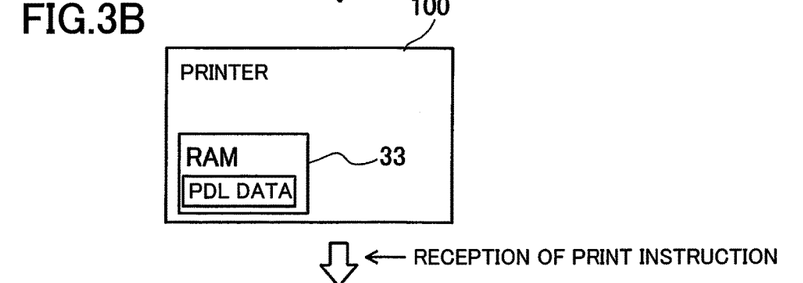

For example, as illustrated in FIG. 3A, the printer 100 receives the print job designating the storage printing from an external device such as a personal computer (PC) via the network interface 37 or the USB interface 38. When the print job designating the storage printing is received, as illustrated in FIG. 3B, the printer 100 stores image data contained in the received print job into the RAM 33. FIG. 3B illustrates an example in which PDL data is stored as the image data. The printer 100 does not perform printing based on the received print job until a print instruction for the print job is accepted.

Figure 3C:
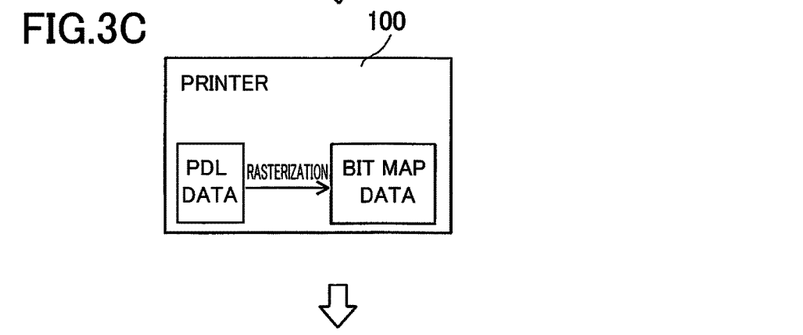
Figure 3D:
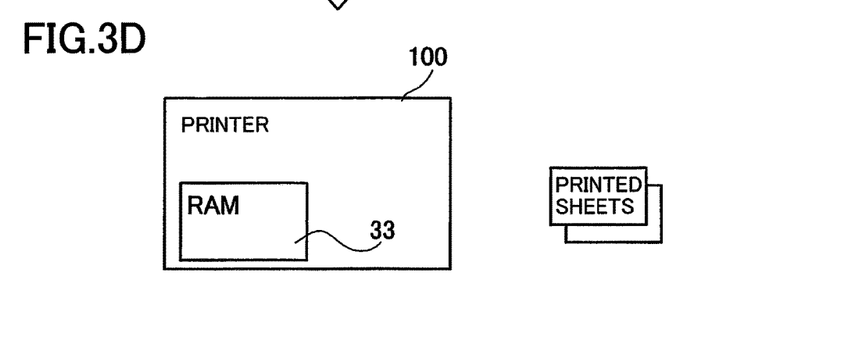

When the print instruction is accepted via the operation panel 40, as illustrated in FIG. 3C, the printer 100 reads the PDL data contained in the received print job, from the RAM 33 and rasterizes the read PDL data to create bit map data. Then, as illustrated in FIG. 3D, the printer 100 prints an image based on the created bit map data. Upon the completion of the printing, the printer 100 deletes the image data (the PDL data and the bit map data) stored in the RAM 33.

For example, the printing for the print job for execution of the storage printing is performed after the user having created the print job comes close to the printer 100 and inputs the print instruction. This configuration reduces a possibility that sheets printed by the storage printing are taken away by another user. That is, the storage printing is suitable for printing of confidential images such as information including secret information and personal information.

There will be next explained operations of the printer 100 in the case where a print job using the carbon-copy printing function and not using the storage printing function is received. FIGS. 4A-4D illustrate the operations of the printer 100 in the case where the print job using the carbon-copy printing function and not using the storage printing function is received.

Figure 4A:
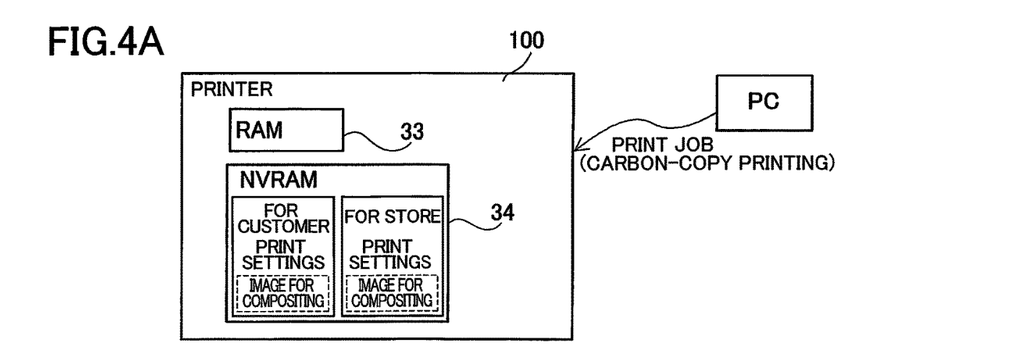
FIGS. 4A through 4D are views for explaining a procedure of the carbon-copy printing without the storage printing.

For example, as illustrated in FIG. 4A, the printer 100 receives a print job for execution of the carbon-copy printing from an external device such as a PC via the network interface 37 or the USB interface 38. When the print job for execution of the carbon-copy printing is received, the printer 100 rasterizes the PDL data contained in the received print job, with different print settings stored in advance to create a plurality of bit map data.

The printer 100 accepts a plurality of print settings in advance and stores them in the NVRAM 34. Examples of the print settings include: designation of the sheet-supply tray to be used; designation of the sheet-output tray to be used; a particular image to be composited; color printing or black and white printing; and the resolution. The print settings include: settings applied when the bit map data is created based on the PDL data; and settings applied when an image is printed based on the bit map data. In an example illustrated in FIG. 4A, the NVRAM 34 of the printer 100 stores two kinds of the print settings. Specifically, the NVRAM 34 stores (i) print settings for customer which include an image to be composited for customer and (ii) print settings for the store which include an image to be composited for store.

Figure 4B:
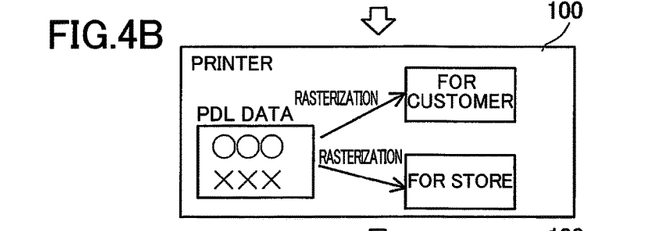
Figure 4C:
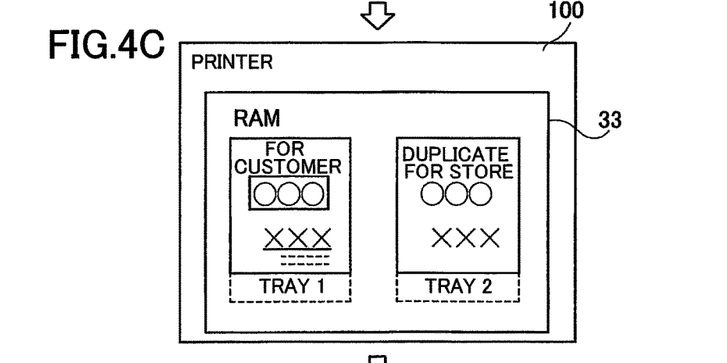

In an example in FIG. 4B, the printer 100 rasterizes one PDL data contained in the received print job, twice using the two kinds of the print settings stored in advance to create two kinds of the bit map data. Then, as illustrated in FIG. 4C, the printer 100 stores the two kinds of the created bit map data into the RAM 33. It is noted that the printer 100 also stores the setting information, such as the designation of the sheet-supply tray, applied when printing is to be executed, in a state in which the setting information is associated with each of the bit map data.

Figure 4D:
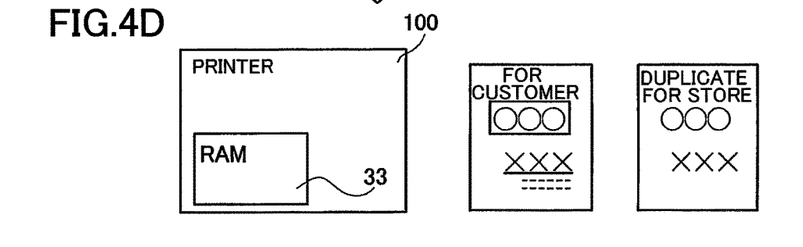

As illustrated in FIG. 4D, the printer 100 sequentially performs printing based on the plurality of created bit map data using the respective print settings and deletes the bit map data from the RAM 33 after the completion of the printing. The PDL data may be deleted at the timing illustrated in FIG. 4C and may be deleted with the bit map data at the timing illustrated in FIG. 4D. It is noted that FIGS. 4B-4D omit illustration of the NVRAM 34, but the contents of the NVRAM 34 are not changed even after reception and printing of the print job for execution of the carbon-copy printing.

Use of the function of the carbon-copy printing enables the printer 100 to perform printing in a plurality of styles based on one received PDL data. For example, as illustrated in FIG. 4D, the printer 100 creates printed sheets for customer and printed sheets for store respectively with different titles and closing lines.

It is noted that image compositing may not be executed in the carbon-copy printing. Alternatively, the print settings on the carbon-copy printing may include both of (i) print settings including image compositing and (ii) print settings not including image compositing. For example, as illustrated in FIG. 4C, in the case where the user designates different sheet-supply trays for the bit map data for customer and the bit map data for store in the print settings on the bit map data, the printer 100 performs printing based on the same data on the sheets supplied from the different sheet-supply trays. However, image compositing is preferable because images for various purposes can be printed based on one data. While two kinds of the printed sheets are obtained in the example in FIGS. 4A-4D, three or more kinds of the printed sheets may be formed in the carbon-copy printing.

In the present embodiment, the printer 100 may use both of the storage printing function and the carbon-copy printing function for one print job. Thus, the printer 100 accepts a print job using both of the storage printing function and the carbon-copy printing function. There will be next explained operations of the printer 100 in the case where the print job using both of the storage printing function and the carbon-copy printing function is received. FIGS. 5A-5D illustrate the operations of the printer 100 in the case where the print job for execution of the carbon-copy printing and using the storage printing function are received. That is, in the case where the received print job is for execution of the carbon-copy printing even where the print job is for execution of the storage printing, the printer 100 performs operations different from those in FIGS. 3A-3D and FIGS. 4A-4D.

Figure 5A:
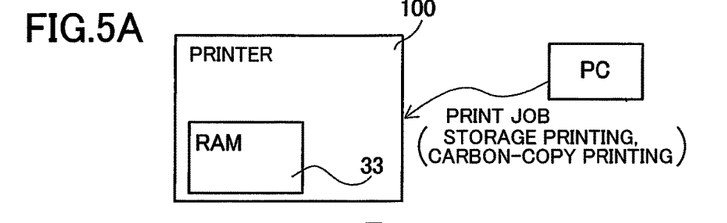
FIGS. 5A through 5D are views for explaining a procedure of the storage printing with the carbon-copy printing.
Figure 5B:
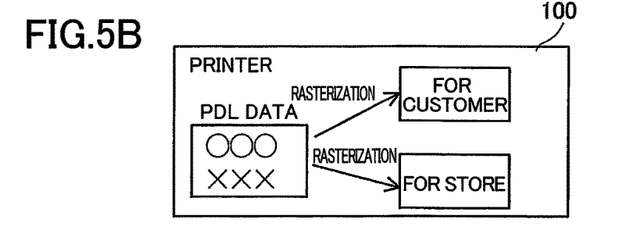
Figure 5C:
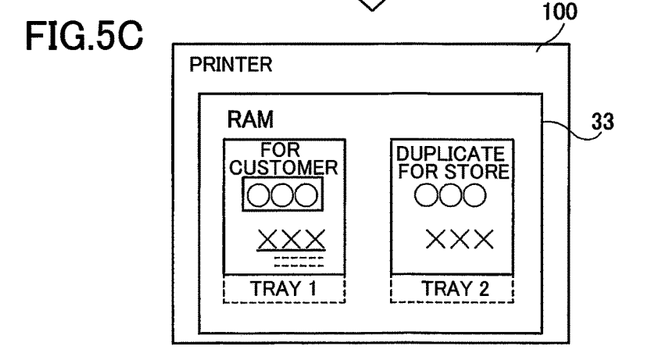

As illustrated in FIG. 5A, the printer 100 receives a print job for execution of the storage printing as in the operation in FIG. 3A. Execution of not only the storage printing but also the carbon-copy printing is designated for this print job. In this case, as illustrated in FIG. 5B, the printer 100 rasterizes PDL data twice to create two kinds of bit map data as in the operation in FIG. 4B without waiting for acceptance of a print instruction. Then, as illustrated in FIG. 5C, the printer 100 stores the two kinds of created bit map data into the RAM 33. These operations are different from those in FIGS. 3B and 3C in the case where the function of the carbon-copy printing is not used. It is assumed that two kinds of the print settings are stored in the example illustrated in FIGS. 5A-5D as in the example illustrated in FIGS. 4A-4D.

Figure 5D:
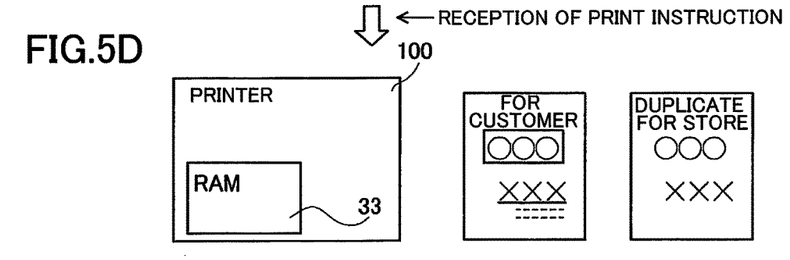

That is, in the case where the print job using both of the storage printing function and the carbon-copy printing function is received, the printer 100 rasterizes the PDL data into the bit map data and stores the bit map data into the RAM 33 even when the print instruction has not been accepted. When the print instruction is accepted via the operation panel 40, as illustrated in FIG. 5D, the printer 100 performs printing based on the stored bit map data. Upon the completion of the printing, the printer 100 deletes the stored bit map data.

Figure 6:
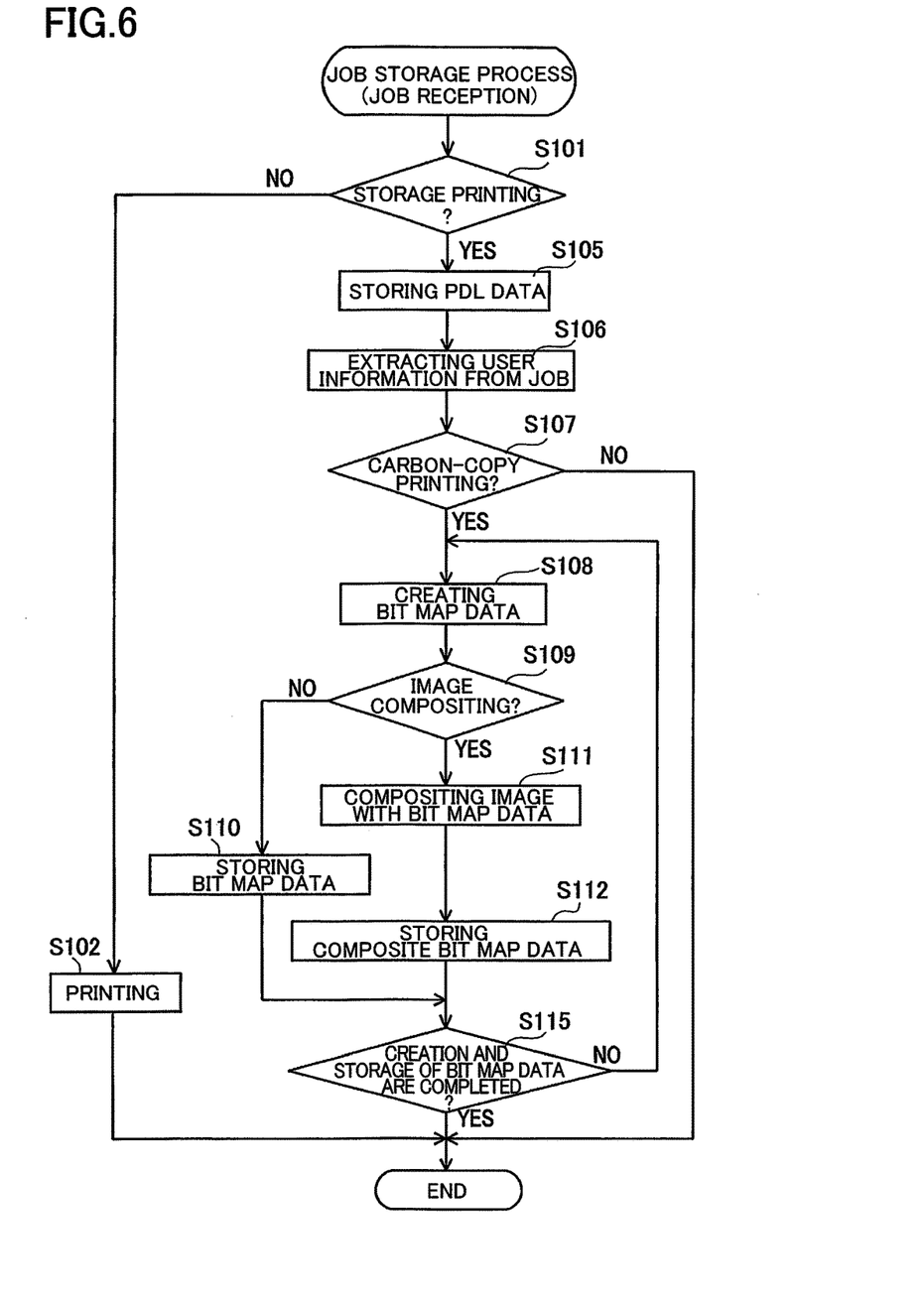
FIG. 6 is a flow chart illustrating a procedure of a job storage process executed by the printer.

There will be next explained, with reference to the flow chart in FIG. 6, a procedure of a job storage process for receiving and processing various kinds of the print jobs using the above-described printing functions. The job storage process is executed by the CPU 31 when the print job is received via the network interface 37 or the USB interface 38.

The job storage process begins with S101 at which the CPU 31 determines whether the received print job is the print job for execution of the storage printing. It is noted that the printer 100 accepts settings on the storage printing as the print settings on the print job. When the CPU 31 determines that the received print job is not the print job for execution of the storage printing (S101: NO), the CPU 31 at S102 controls the printer 100 to perform printing without waiting for acceptance of the print instruction, and this job storage process ends.

When the CPU 31 determines that the received print job is the print job for execution of the storage printing (S101: YES), the CPU 31 at S105 stores the PDL data contained in the received print job, into the RAM 33. FIGS. 7A-7D schematically illustrate a process of storage of data in a memory area 331 of the RAM 33. The memory area 331 is provided for image data. When the PDL data is stored into the memory area 331 at S105, the state of the memory area 331 is changed from the state in FIG. 7A to the state in FIG. 7B. It is noted that FIGS. 7A-7D are illustrated assuming that there is no print jobs being printed or stored except for the print job received at this time.

After the processing at S105, the CPU 31 at S106 extracts user information from the print job. It is noted that the processings at S105 and S106 may be executed in reverse order. The CPU 31 at S107 determines whether the carbon-copy printing is set for the extracted user information. The carbon-copy printing is one example of particular printing.

Figure 8:
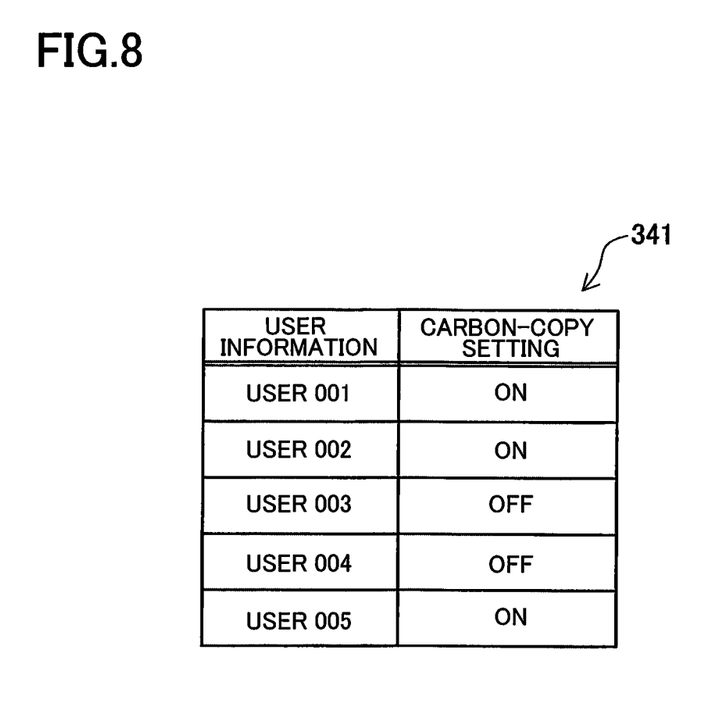
FIG. 8 is a view for explaining carbon-copy information.

For example, as illustrated in FIG. 8, the NVRAM 34 stores carbon-copy information 341 containing the user information and a carbon-copy setting in association with each other. The carbon-copy setting is information about whether the carbon-copy printing is to be executed. Each of the NVRAM 34 and the carbon-copy information 341 is one example of information storage, and the carbon-copy setting is one example of execution information.

In the example in FIG. 8, the carbon-copy setting for each of a user 001, a user 002, and a user 005 is ON, and the carbon-copy setting for each of a user 003 and a user 004 is OFF. That is, in the case where the user having created the received print job is any of the user 001, the user 002, and the user 005, the printer 100 performs the carbon-copy printing for the print job. In the case where the user having created the received print job is the user 003 or the user 004, the printer 100 does not perform the carbon-copy printing for the print job.

The CPU 31 at S107 reads the carbon-copy information 341 from the NVRAM 34, and when the carbon-copy setting stored in association with the user having created the received print job is ON, the CPU 31 determines that the print job is the print job for execution of the carbon-copy printing. In contrast, when the carbon-copy setting stored in association with the user having created the received print job is OFF, the CPU 31 determines that the print job is not the print job for execution of the carbon-copy printing. That is, the CPU 31 determines, based on the carbon-copy information 341, whether the carbon-copy printing is to be performed, thereby eliminating the need for setting whether the carbon-copy printing is to be performed, for each print job by the user having created the print job.

Figure 7A:
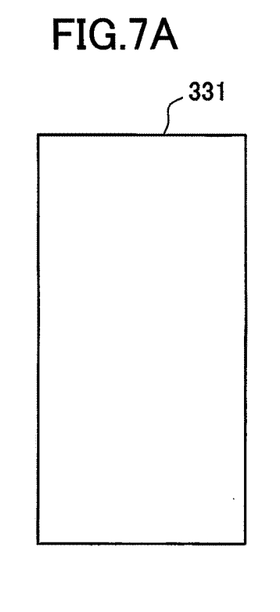
FIGS. 7A through 7D are views for explaining one example of storage of data into a memory.
Figure 7B:
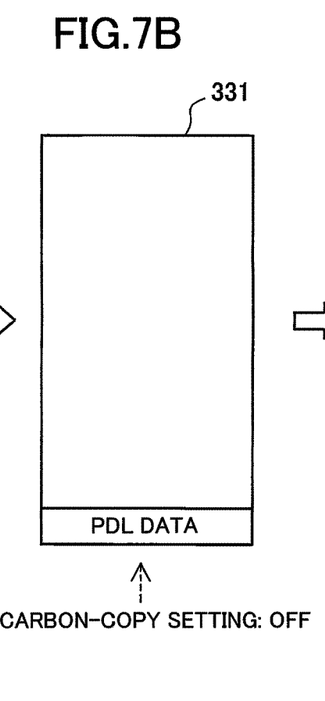

When the CPU 31 determines that the print job is not the carbon-copy printing (S107: NO), this job storage process ends. When the print job is the print job for execution of the storage printing not using the carbon-copy printing, the printer 100 rasterizes the PDL data when having accepted the print instruction. As a result, as illustrated in FIG. 7B, only the PDL data contained in the print job is stored in the memory area 331.

When the CPU 31 determines that the print job is the carbon-copy printing (S107: YES), the CPU 31 at S108 rasterizes the PDL data based on one of the print settings on the carbon-copy printing to create one bit map data. It is noted that, as will be described below, the CPU 31 executes the processing at S108 a plurality of times for one print job.

The CPU 31 at S109 determines whether image compositing is set in the print settings. When the CPU 31 determines that the image compositing is not set (S109: NO), the CPU 31 at S110 stores the bit map data created at S108, into the RAM 33. When the CPU 31 determines that the image compositing is set (S109: YES), the CPU 31 at S111 composites a particular image with the bit map data created at S108. After image compositing, the CPU 31 at S112 stores the composite bit map data into the RAM 33.

Figure 7C:
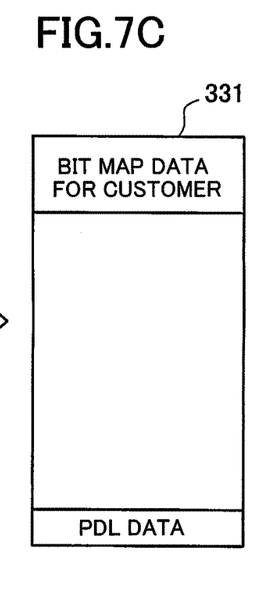

As illustrated in FIG. 7C, one bit map data is stored in the memory area 331 in the processing at S110 or S112 for the first time. The stored bit map data is representative of an image for customer in FIG. 4C, for example. This bit map data is one example of first bit map data. It is noted that arrangement of image data in the memory area 331 is not limited to that in FIGS. 7A-7D.

After the processing at S110 or S112, the CPU 31 at S115 determines whether creation of all the bit map data is completed based on the stored print settings. When the CPU 31 determines that the creation has not been completed (S115: NO), this flow returns to S108 at which the CPU 31 creates and stores the next bit map data as the bit map data created for the second time. The next bit map data is one example of second bit map data. That is, the CPU 31 rasterizes the PDL data based on the next one of the print settings on the carbon-copy printing, and when image compositing is set, the CPU 31 composites the image and stores created bit map data into the RAM 33.

Figure 7D:
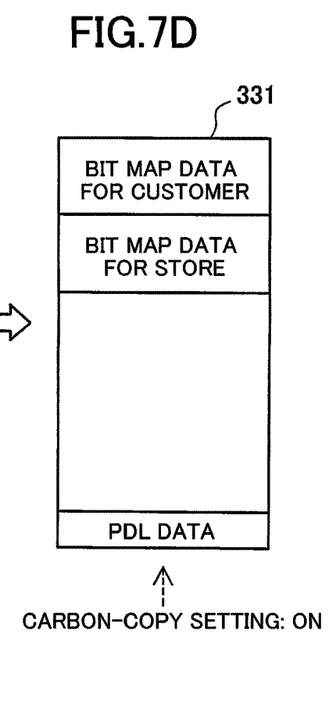

When the CPU 31 determines that the creation of all the bit map data is completed (S115: YES), this job storage process ends. For example, in the case of the carbon-copy printing with two kinds of the print settings as in the example in FIGS. 4A-4D, the two kinds of the bit map data and the PDL data are stored in the memory area 331 as illustrated in FIG. 7D. In the case of the carbon-copy printing with three or more kinds of the print settings, the PDL data and the bit map data corresponding to the number of the print settings are stored.

When the print job for execution of the storage printing is received, and the print job is for execution of the carbon-copy printing, the printer 100 waits in the state in which both of the PDL data and the bit map data are stored in the RAM 33, until the print instruction is accepted. In particular, there is a high possibility that an amount of the bit map data after rasterization is larger than that of the PDL data before rasterization. Thus, in the case where a plurality of bit map data are stored, a free space of the RAM 33 is reduced. The PDL data is preferably stored without rasterization into the bit map data to store a larger number of print jobs by providing enough free space of the RAM 33.

Incidentally, the carbon-copy printing is in many cases used mainly in a store or the like to print a document to be given to a customer and its duplicate together. In this purpose, a length of time from acceptance of the print instruction to a start of printing is preferably as short as possible to give the printed sheets to the customer as early as possible.

Thus, in the case where the print job for execution of the carbon-copy printing is received, the printer 100 rasterizes the PDL data to a plurality of the bit map data and stores them into the RAM 33 before accepting the print instruction. With this operation, when compared with the case where the processing for rasterizing the PDL data to the plurality of bit map data is started after acceptance of the print instruction, the free space of the RAM 33 is small, but there is a high possibility that a length of time from acceptance of the print instruction to the completion of printing is short, resulting in higher possibility of providing the printed sheets for the user earlier.

Figure 9:
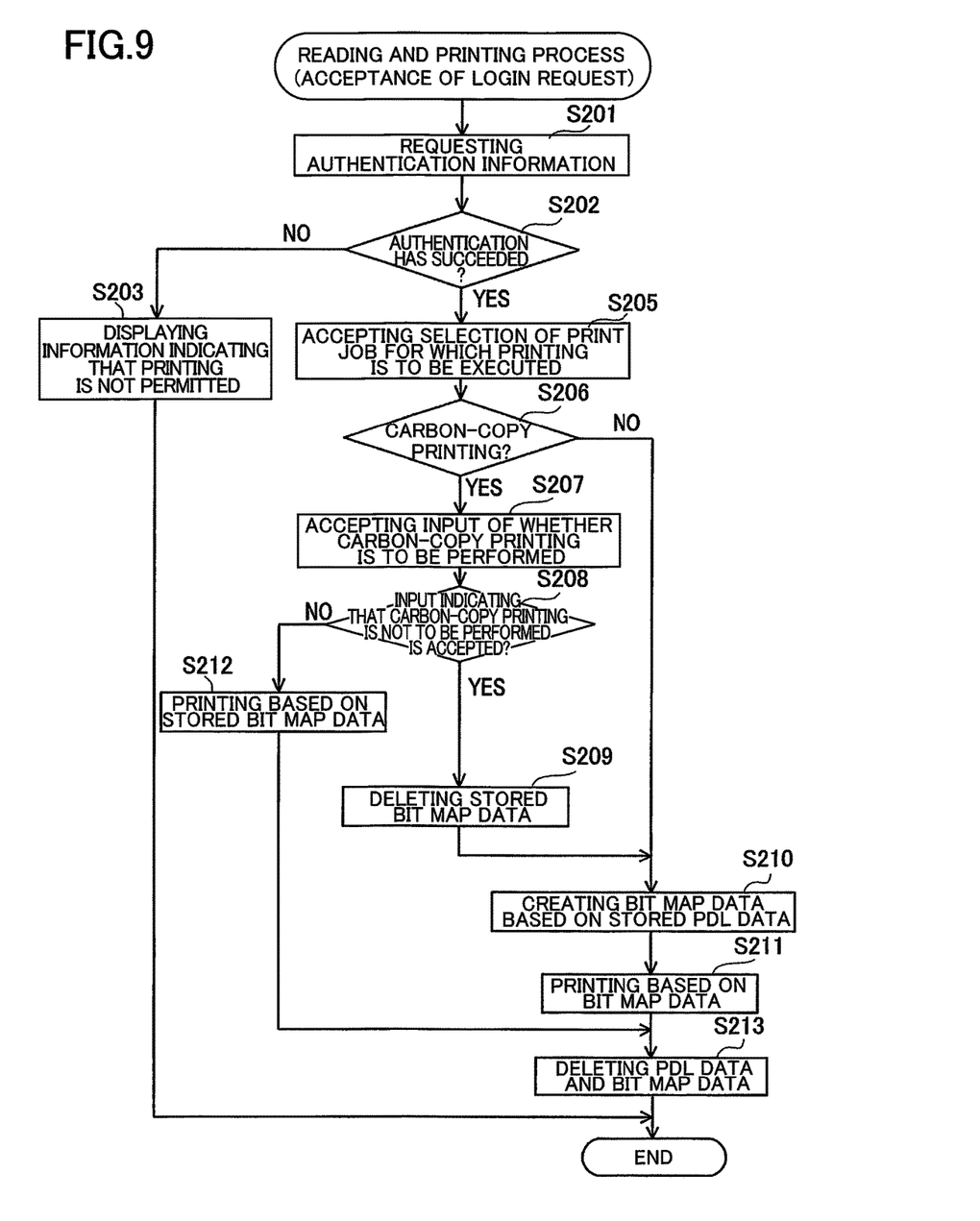
FIG. 9 is a flow chart illustrating a procedure of a reading and printing process executed by the printer.

There will be next explained, with reference to the flow chart in FIG. 9, a procedure of a reading and printing process for reading and printing the image data contained in the print job for execution of the storage printing. The CPU 31 executes the reading and printing process when the printing start button provided on the operation panel 40 is pressed or when input of information to be performed in advance of the start of printing is accepted in the state in which the image data contained in the print job for execution of the storage printing is stored, i.e., in the state illustrated in FIG. 7B or FIG. 7D. One example of the input of information to be performed in advance of the start of printing is an instruction of a start of user authentication.

The reading and printing process begins with S201 at which the CPU 31 controls the operation panel 40 to display information requesting the user to input authentication information, and the CPU 31 accepts input of the authentication information. Examples of the authentication information include a user ID, a password, near-field communication information (e.g., an ID card), and physical information (e.g., a fingerprint and a palm print).

The CPU 31 at S202 determines whether the user authentication has succeeded based on the input authentication information. When the CPU 31 determines that the authentication has failed (S202: NO), the CPU 31 at S203 controls the operation panel 40 to display information indicating that printing is not permitted, and the reading and printing process ends. When the CPU 31 determines that the authentication has failed, the printer 100 may accept a retry.

When the CPU 31 determines that the user authentication has succeeded (S202: YES), the CPU 31 at S205 accepts selection of a print job for which printing is to be executed, among the print jobs stored in the RAM 33. For example, the CPU 31 controls the operation panel 40 to display a list of print jobs for the user and accepts selection of the print job for which printing is to be executed. The input of instruction for selecting and determining the print job serves as the print instruction for the print job. In the case where no print job is stored for the user having succeeded in the user authentication, the CPU may display information indicating that no job is stored, and terminate the reading and printing process.

The CPU 31 at S206 determines whether the selected print job is a print job for execution of the carbon-copy printing. As described above, whether the carbon-copy printing is to be performed is set for each user, and the storage print jobs for the user for which execution of the carbon-copy printing is set are stored as a plurality of bit map data. Thus, for example, the CPU 31 checks the carbon-copy information 341 and the user information on the user having logged in, and when the carbon-copy setting for the user is ON, the CPU 31 determines that the selected print job is the print job for execution of the carbon-copy printing. Alternatively, when a plurality of bit map data are stored for the selected print job, the CPU 31 determines that the selected print job is the print job for execution of the carbon-copy printing.

When the CPU 31 determines that the selected print job is the print job for execution of the carbon-copy printing (S206: YES), the CPU 31 at S207 accepts input of whether the carbon-copy printing is to be performed. For example, the CPU 31 controls the operation panel 40 to display an inquiry about whether execution of the carbon-copy printing is allowed, and the CPU 31 accepts input of the user. Since the CPU 31 inquires about whether execution of the carbon-copy printing is allowed before printing, even in the case where the user is set for execution of the carbon-copy printing, the printer 100 can perform printing for purposes not using the carbon-copy printing such as temporary printing for check of a printed image.

The CPU 31 at S208 determines whether the CPU 31 accepts an input indicating that the carbon-copy printing is not to be performed. When the CPU 31 determines that the CPU 31 accepts the input indicating that the carbon-copy printing is not to be performed (S208: YES), the CPU 31 at S209 deletes the plurality of stored bit map data. As a result, the state of the memory area 331 is changed from the state in FIG. 7D to the state in FIG. 7B.

After the processing at S209 or when the CPU 31 determines that the selected print job is not the print job for execution of the carbon-copy printing (S206: NO), the CPU 31 at S210 rasterizes the stored PDL data to create the bit map data. The bit map data created at S210 is one example of third bit map data. The CPU 31 at S211 controls the image former 10 to print an image based on the created bit map data.

When the CPU 31 determines that the CPU 31 does not accept the input indicating that the carbon-copy printing is not to be performed (S208: NO), the CPU 31 at S212 controls the image former 10 to sequentially print images based on the plurality of stored bit map data. It is noted that the CPU 31 may determine that the CPU 31 does not accept the input indicating that the carbon-copy printing is not to be performed, when the CPU 31 accepts input indicating that the carbon-copy printing is to be performed or when the CPU 31 does not accept the input indicating that the carbon-copy printing is not to be performed, within a particular length of time.

Upon the completion of printing at S211 or S212, the CPU 31 at S213 deletes all the PDL data and the bit map data contained in the print job for which printing is finished, and the reading and printing process ends. As a result, no image data is stored in the memory area 331, and the memory area 331 is in the state in FIG. 7A.

In the printer 100 as described above, when the received print job is the print job for execution of the storage printing, the CPU 31 determines whether the carbon-copy printing is to be performed for the print job. When the CPU 31 determines that the carbon-copy printing is to be performed, the printer 100 rasterizes the PDL data contained in the print job to create the plurality of bit map data and stores them into the RAM 33 before the print instruction is accepted. In the case of the carbon-copy printing, there tends to be a high necessity of early obtainment of printed sheets. Thus, there is a high possibility that printing is performed early, and data is deleted early. That is, even in the case where the bit map data is created and stored, there is a low possibility that the data contained in the print job remains in the RAM 33 for a long time. In the present embodiment, since the bit map data is created and stored, a waiting time to the start of printing after acceptance of the print instruction is shortened, making it possible for the user to take printed sheets earlier.

While the embodiment has been described above, it is to be understood that the disclosure is not limited to the details of the illustrated embodiment, but may be embodied with various changes and modifications, which may occur to those skilled in the art, without departing from the spirit and scope of the disclosure. For example, application of the present disclosure is not limited to the printer, and the present disclosure may be applied to any image forming apparatuses such as multi-function peripherals, copiers, scanners, and facsimile machines.

In the above-described embodiment, the setting on whether the function of the storage printing is to be used is accepted in the print settings on the print job, but the present disclosure is not limited to this configuration. For example, the setting on whether the function of the storage printing is to be used may be determined for each user or for each device configured to transmit the print job.

The way of providing the print instruction for the storage printing is not limited to pressing of the printing start button. For example, the printer 100 may be configured such that the CPU 31 accepts input of authentication information for user authentication, and when the user authentication has succeeded, the CPU 31 performs printing for all the print jobs for the user having succeeded in the authentication among the stored print jobs. In this configuration, the input of the information for the user authentication is one example of the print instruction. In the case where the printer 100 has a configuration for user authentication independently of the operation panel 40, this configuration is another example of the receiver.

In the above-described embodiment, whether the carbon-copy printing is to be performed is determined in advance for each user in the carbon-copy information 341, but the present disclosure is not limited to this configuration. For example, whether the carbon-copy printing is to be performed may be determined based on device information for a device having transmitted the print job. Specifically, the device information and the presence or absence of execution of the carbon-copy printing are stored in association with each other as the carbon-copy information 341. This configuration allows the user to designate a device specific to the carbon-copy printing, and accordingly the user may transmit a print job using the carbon-copy printing, from the device, for example. Examples of the device information include the name of node, and an IP address. Also, the settings on the carbon-copy printing may be accepted in the print settings on the print job.

The carbon-copy information 341 is stored in the NVRAM 34 of the printer 100 in the above-described embodiment but may be stored in an external device such as a print server, for example. In this configuration, the printer 100 transmits the user information obtained from the print job, to the external device such as the print server, receives from the external device information about whether the carbon-copy printing is to be performed, and determines whether the carbon-copy printing is to be performed based on the received information. Alternatively, the external device such as the print server receives the print job and transmits the received print job to the printer 100 in addition to the information about whether the carbon-copy printing is to be performed. In the case where the carbon-copy information 341 is managed by the external device, it is possible to eliminate the need for setting the carbon-copy information even in the case where a plurality of the printers 100 are used. On the other hand, in the case where the carbon-copy information 341 is managed by the individual printers 100, it is possible to set the carbon-copy information 341 for each of the printers 100.

User authentication may be executed by the printer 100 based on information stored therein and may be executed by an external device such as a server. The printer 100 may not execute user authentication. For example, the printer 100 may start executing the reading and printing process in response to, e.g., an instruction for displaying a list of the print jobs, then start the process from the processing at S205 in FIG. 9 to display the list of the print jobs without user authentication, and then accept selection of the print job for which printing is to be performed. Also, the print jobs may include jobs requiring user authentication and jobs not requiring user authentication, depending upon settings on the individual print jobs. Also, a password may be set for each print job.

In the above-described embodiment, the CPU 31 inquires about whether the carbon-copy printing is allowed, before printing of the data of the print job which is stored for the carbon-copy printing. However, the inquiry may be omitted. That is, when the positive decision (YES) is made at S206, this flow may go to S212. However, the inquiry at printing enables the user to change a type of printing after transmission of the print job.

Image compositing is performed before the bit map data is stored in the above-described embodiment. However, the printer 100 may store the bit map data before image compositing and perform image compositing before printing. It is noted that the length of time from acceptance of the print instruction to the completion of printing is shorter when image compositing is performed before storage than when image compositing is performed before printing.

In the above-described embodiment, the printer 100 includes the storage, the receiver, and the controller. The present disclosure may be applied to a printing system in which one or some of the storage, the receiver, and the controller are included in, e.g., a print server communicable with the printer 100, for example. The communicator may be any one of the network interface 37 and the USB interface 38 and may have communicable configuration in addition to the network interface 37 and/or the USB interface 38.

The processings in the above-described embodiment may be executed by hardware such as a single CPU, a plurality of CPUs, and an ASIC or combination thereof. Also, the processings in the above-described embodiment may be executed in various forms such as a non-transitory storage medium storing instructions for executing the processings and methods for executing the processings.

What is claimed is:

1. A printer, comprising:
a communicator configured to receive a print job;
a storage;
an image former configured to print an image on a sheet;
a receiver configured to receive a print instruction; and
a controller configured to execute:
storage printing in which printing is performed based on the print job when the print instruction for the print job is received via the receiver, the print instruction being received after reception of the print job;
carbon-copy printing in which a creating processing in which a plurality of bit map data are created by rasterizing page-description-language data contained in the print job, and a plurality of images are respectively printed based on the plurality of created bit map data; and
determining whether the received print job is a storage print job for execution of the carbon-copy printing, wherein, when it is determined that the received storage print job is a print job for execution of the carbon-copy printing, the controller is configured to perform:
before receiving a print instruction for the received storage print job,
creating a plurality of bit map data by rasterizing page-description-language data contained in the received storage print job; and
storing the plurality of created bit map data into the storage; and, wherein the controller is configured to perform
controlling the image former to respectively print a plurality of images based on the plurality of bit map data stored in the storage when the print instruction for the received storage print job is received, and
wherein, when it is determined that the received storage print job is a print job not for execution of the carbon-copy printing, the controller is configured to perform:
creating a single bit map data by rasterizing page-description-language data contained in the received storage print job; and
controlling the image former to print an image based on the created single bit map data when a print instruction for the received storage print job is received.

2. The printer according to claim 1,
wherein the controller is configured to, when it is determined that the received storage print job is the print job for execution of the carbon-copy printing, control the image former to respectively print the images based on the plurality of bit map data stored in the storage when the print instruction for the received storage print job is received via the receiver in a state in which the plurality of bit map data are stored in the storage; and
wherein the controller is configured to, when it is determined that the received storage print job is the print job not for execution of the carbon-copy printing, perform:
storing the page-description-language data contained in the received storage print job into the storage;
rasterizing the page-description-language data stored in the storage to create the single bit map data when the print instruction for the received storage print job is received via the receiver in a state in which the page-description-language data contained in the storage print job is stored in the storage; and
controlling the image former to print the image based on the single created bit map data.

3. The printer according to claim 1,
wherein the controller is configured to, when the storage print job is received, store the page-description-language data contained in the received storage print job into the storage, and
wherein the controller is configured to, when it is determined that the received storage print job is the print job for execution of the carbon-copy printing, perform:
storing, into the storage, the plurality of bit map data created by rasterizing the page-description-language data stored in the storage; and
controlling the image former to respectively print the plurality of images based on the plurality of bit map data stored in the storage when a print instruction for the print job for execution of the carbon-copy printing is received in a state in which the plurality of bit map data are stored in the storage.

4. The printer according to claim 1, further comprising a non-transitory information storage configured to store execution information and one of device information and user information in a state in which the execution information and the one of device information and user information are associated with each other, wherein the execution information indicates whether the storage print job is the print job for execution of the carbon-copy printing,
wherein the controller is configured to:
obtain, via the communicator, one of (i) device information about a device having transmitted the received storage print job and (ii) user information related to the storage print job; and
determine whether the storage print job is the print job for execution of the carbon-copy printing, based on the execution information stored in the non-transitory information storage in association with the obtained one of the device information and the user information.

5. The printer according to claim 1,
wherein the communicator is communicable with an external device configured to store execution information and one of device information and user information in a state in which the execution information and the one of device information and user information are associated with each other, wherein the execution information indicates whether the storage print job is the print job for execution of the carbon-copy printing,
wherein the controller is configured to:
obtain, via the communicator, one of (i) device information about a device having transmitted the received storage print job and (ii) user information related to the storage print job;
transmit particular information as the obtained one of the device information and the user information, to the external device via the communicator; and
determine whether the storage print job is the print job for execution of the carbon-copy printing, based on the execution information stored in the external device in association with the particular information transmitted from the external device via the communicator.

6. The printer according to claim 1, wherein the controller is configured to:
store the page-description-language data contained in the received storage print job into the storage;
receive input of information about whether execution of the carbon-copy printing is allowed, when the print instruction for the received storage print job is received via the receiver;
when information indicating that execution of the carbon-copy printing is allowed is input, control the image former to respectively print the plurality of images based on the plurality of bit map data stored in the storage; and
when information indicating that execution of the carbon-copy printing is not allowed is input, rasterize the stored page-description-language data to create a single bit map data, and control the image former to print an image based on the created single bit map data.

7. The printer according to claim 1, wherein the controller is configured to:
execute a compositing processing in which the controller composites a particular image with at least one of images based on the plurality of created bit map data to form at least one composite image; and
control the image former to print the at least one composite image based on the bit map data for which the compositing processing has been executed.

8. The printer according to claim 7, wherein the controller is configured to:
when the received storage print job is the print job for execution of the carbon-copy printing, execute the compositing processing after the plurality of bit map data are created by rasterizing the page-description-language data contained in the received storage print job and before the created plurality of bit map data are stored into the storage; and
store, into the storage, the plurality of bit map data with which the particular image has been composited in the compositing processing.

9. The printer according to claim 1, wherein, when it is determined that the received storage print job is a print job for execution of the carbon-copy printing, the controller is configured to control the image former to execute:
a first printing in which a first image is printed on a first sheet based on a first bit map data of the created plurality of bit map data, the first bit map data being created based on a first print setting;
a second printing in which a second image is printed on a second sheet based on a second bit map data that is different from the first bit map data, the second bit map data being created based on a second printing setting, and
wherein each of the first print setting and the second print setting includes at least one of (a) a particular image to be composited or not, (b) color printing or black and white printing, and (c) the resolution.

10. The printer according to claim 1, wherein, when it is determined that the received storage print job is a print job not for execution of the carbon-copy printing, the controller is configured to perform creating the single bit map data by rasterizing the page-description-language data after receiving the print instruction for the received storage print job.

11. A printer, comprising:
a communicator configured to receive a print job;
an image former configured to print an image on a sheet;
a receiver configured to receive a print instruction; and
a controller configured to perform:
determining whether the received print job is a print job for execution of particular printing;
when it is determined that the received print job is a print job for execution of the particular printing, before receiving a print instruction for the received print job, creating first bit map data and second bit map data by rasterizing page-description-language data contained in the received print, job, and storing the created first bit map data and the created second bit map data into the storage;
controlling the image former to respectively print a first image and a second image based on the first bit map data and the second bit map data stored in the storage when the print instruction for the received print, job is received;
when it is determined that the received print job is not a print job for execution of the particular printing, creating a single bit map data by rasterizing page-description-language data contained in the received print job; and
controlling the image former to print an image based on the created single bit map data, when the print instruction for the received print job is received via the receiver.

12. A non-transitory storage medium storing a plurality of instructions executable by a computer of a printer, wherein the printer comprises: a storage; an image former configured to print an image on a sheet; and a receiver configured to receive a print instruction, wherein when executed by the computer, the plurality of instructions cause the printer to perform:

determining whether a received storage print job is a storage print job for execution of a carbon-copy printing;

wherein, when it is determined that the received storage print job is a print job for execution of the carbon-copy printing, the controller is configured to perform before receiving a print instruction for the received storage print job:

creating a plurality of bit map data by rasterizing page-description-language data contained in the received storage print job; and storing the plurality of created bit map data into the storage; and wherein the controller is further configured to control the image former to respectively print a plurality of images based on the plurality of bit map data stored in the storage when the print instruction for the received storage print job is received, and wherein, when it is determined that the received storage print job is a print job not for execution of the carbon-copy printing, perform:

creating a single bit map data by rasterizing page-description-language data contained in the received storage print job; and controlling the image former to print an image based on the single created bit map data when the print instruction for the received storage print job is received.

* * * * *

UNITED STATES PATENT AND TRADEMARK OFFICE
CERTIFICATE OF CORRECTION

Page 1 of 1

PATENT NO. : 10,027,840 B2
APPLICATION NO. : 15/471848
DATED : July 17, 2018
INVENTOR(S) : Chika Tabushi et al.

It is certified that error appears in the above-identified patent and that said Letters Patent is hereby corrected as shown below:

In the Claims

Column 16, Claim 11, Line 49 should read:
data contained in the received print job, and storing Column 16, Claim 11, Line 55 should read:
when the print instruction for the received print job Signed and Sealed this
Eighth Day of January, 2019

Andrei Iancu
*Director of the United States Patent and Trademark Office*